Feb. 9, 1954          H. CONRAD ET AL          2,668,289
STITCH FAILURE DETECTOR
Filed March 10, 1951                                 4 Sheets-Sheet 1
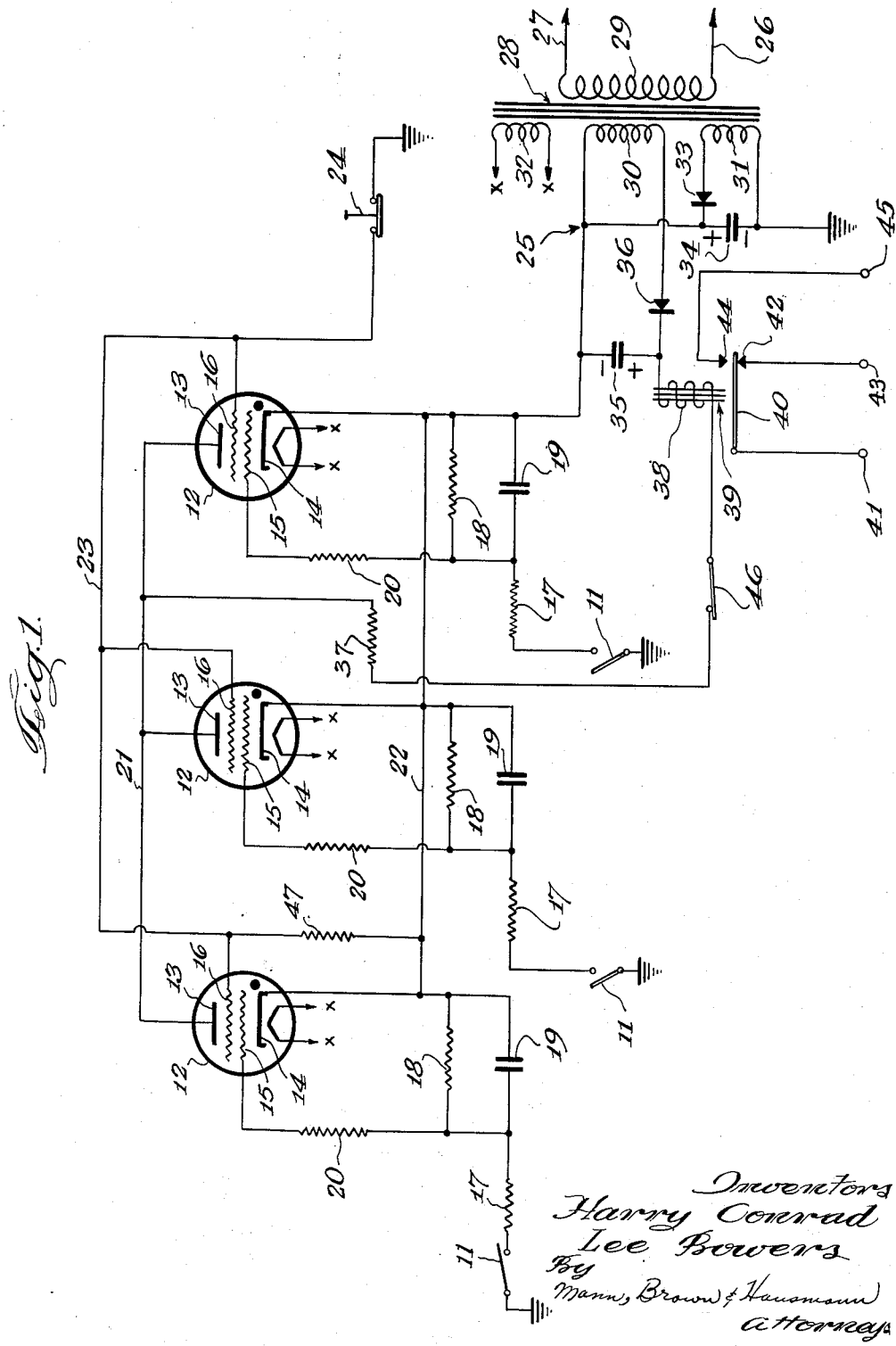
Inventors
Harry Conrad
Lee Bowers
By
Mann, Brown & Hausmann
Attorneys

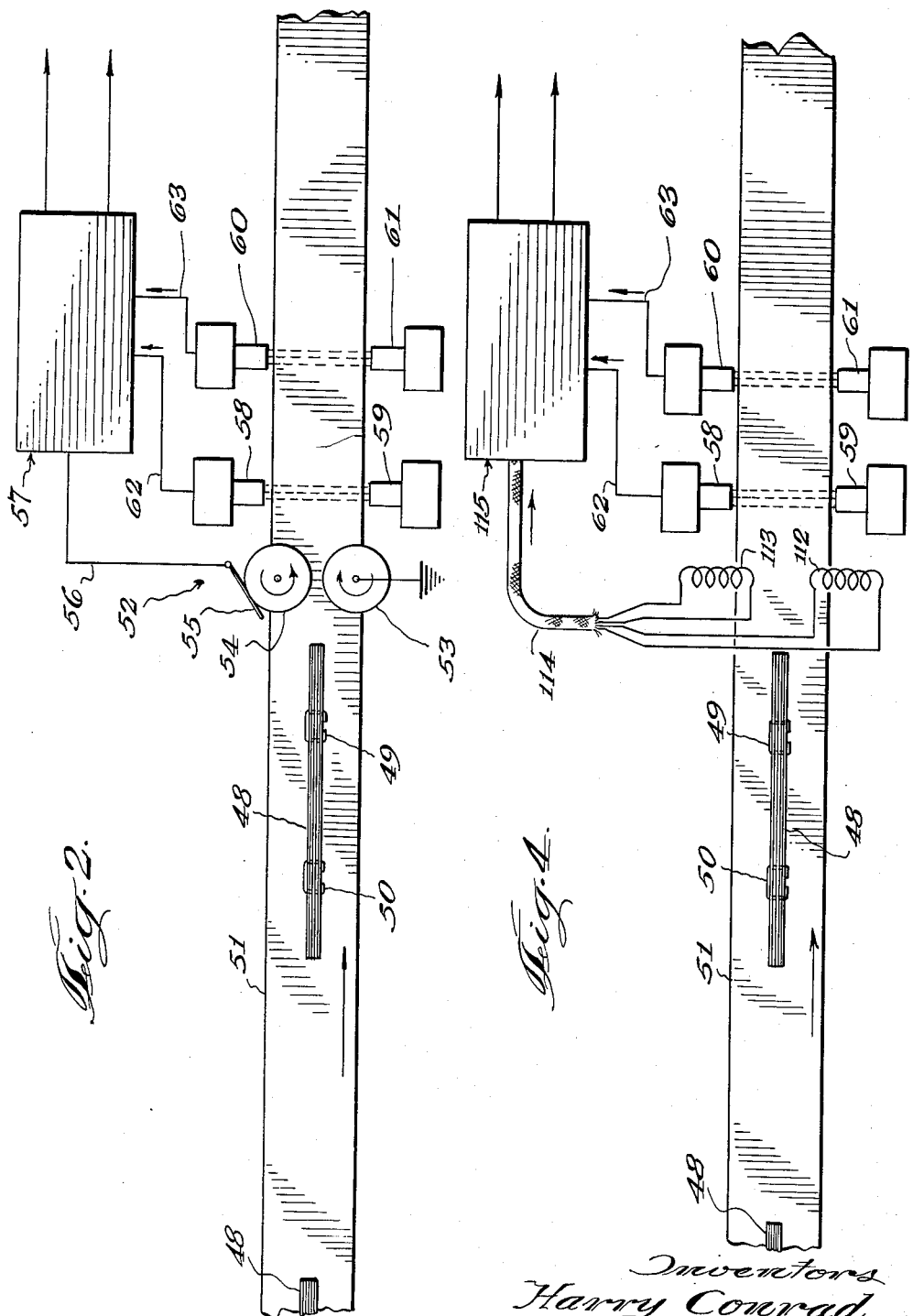

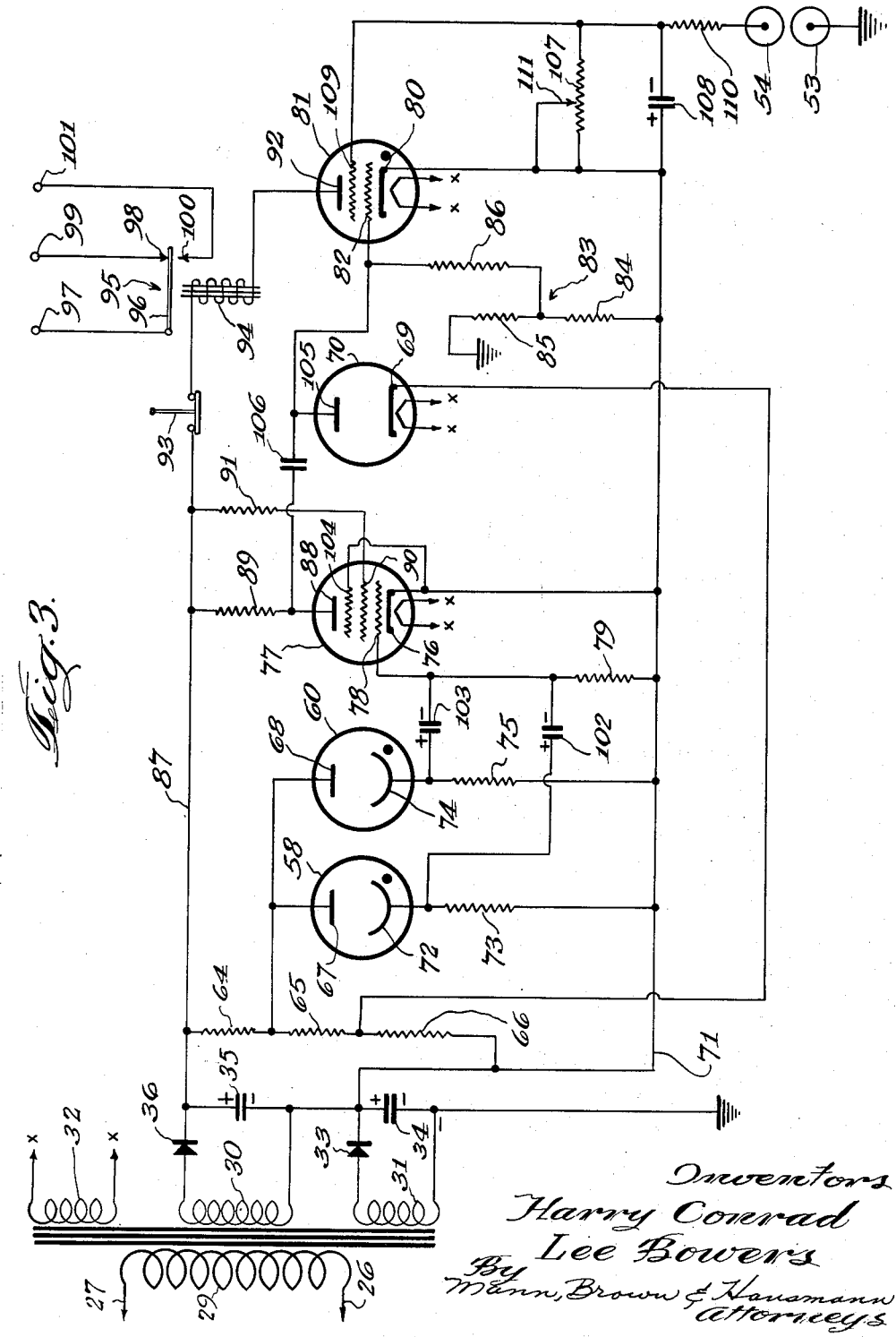

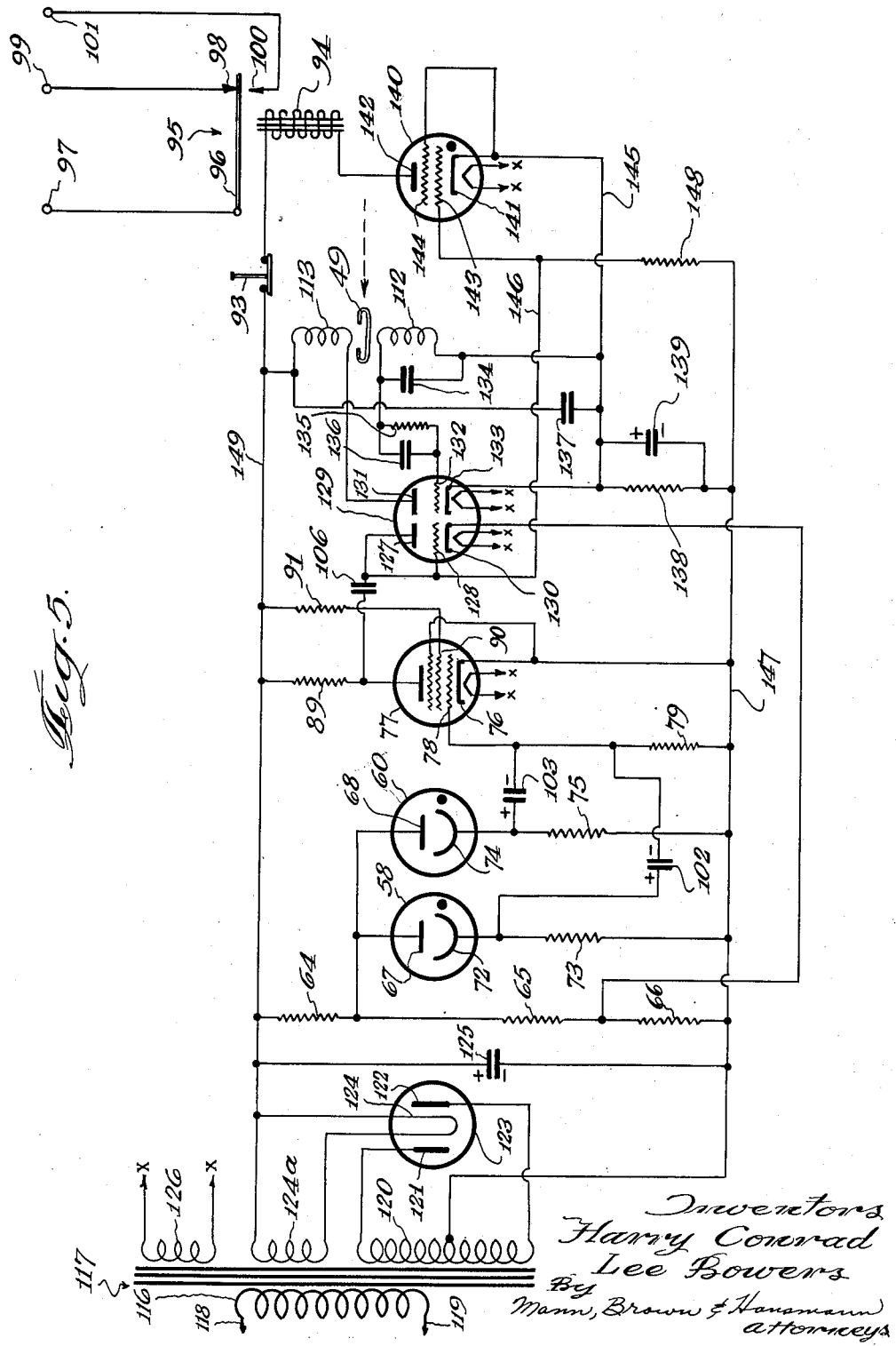

Patented Feb. 9, 1954

2,668,289

UNITED STATES PATENT OFFICE 2,668,289

STITCH FAILURE DETECTOR

Harry Conrad and Lee Bowers, Mount Morris, Ill.

Application March 10, 1951, Serial No. 214,965

24 Claims. (Cl. 1—4)

Our invention relates to stitch failure detectors for inspecting stitches of metal or other conductive material used in assembly processes. While the stitch failure detectors illustrated and described herein are particularly designed for testing the stitches formed in magazines and other pamphlets, our invention is not limited to such use but is adapted to inspect stitches formed in a wide variety of products.

Stitching machines are used in many modern assembly processes and provide a fast, efficient, and economical method of joining parts of a complete assembly or subassembly. Different assemblies require different numbers of stitches, and in some assemblies the positioning of the stitches is critical, whereas in other assemblies a wide variation in the positioning of the stitches is permissible. Heretofore the only practical method of inspecting the stitches of such assemblies has been by visual examination, and that method of inspection is expensive and unsatisfactory.

An object of our invention is to provide a simple, inexpensive, and reliable stitch failure detector for automatically testing stitches formed in a variety of products.

Another object of our invention is to provide a stitch failure detector which may be readily adapted to test substantially simultaneously any desired number of stitches.

A further object is to provide a stitch failure detector that will automatically determine whether a stitch is improperly formed, missing, or misplaced from its proper position in the product.

Another object is to provide a stitch failure detector that may be adapted to allow any desirable tolerance in the positioning of the stitches in a product.

Still another object is to provide a stitch failure detector that may be adapted to allow different degrees of tolerance in the correct formation of a stitch.

Another object is to provide a stitch failure detector that may be used to test the stitches as they are being formed in the product by a stitching machine.

Another object is to provide a stitch failure detector that may be used in conjunction with a conveyor belt or other means to test stitches in a product subsequent to the formation of the stitches therein.

Another object is to provide a stitch failure detector that may be utilized to stop a stitching machine or conveyor belt, operate a signal light or alarm, or perform numerous other functions upon detection of a missing, faulty, or misplaced stitch.

These and other objects and advantages will become apparent as the disclosure proceeds and the description is read in conjunction with the accompanying drawings in which:

Fig. 1 is a schematic diagram of one form of the stitch failure detector associated with a stitching machine;

Fig. 2 is a layout diagram of the stitch failure detector for inspecting stitches made in a magazine;

Fig. 3 is a schematic diagram of the detector shown in Fig. 2;

Fig. 4 is a layout diagram of a magnetic form of the detector to inspect the stitches made in a magazine; and Fig. 5 is a schematic diagram of the detector shown in Fig. 4.

In the following description and the drawings we have illustrated our detector for use in testing the stitches formed in a magazine. The versatility of the detector is particularly brought out in complying with the requirements of such use. For instance, in certain cases it may be desirable to test the stitches while they are being formed, while in other cases it may be desirable to test the stitches after they have been formed and the product has left the stitching machine.

To provide its versatility, our detector basically consists of three fundamental sections. A first circuit portion serves to perform a test on the stitch to determine whether it is properly formed. A second circuit portion indicates when the product is in position to have the stitch tested. The third circuit portion integrates the outputs of the first and second circuit portions to indicate when the stitch or stitches tested are faulty.

Referring now to Fig. 1, the magazine is to have three stitches placed therein and the detector is so associated with the clinchers of a stitching machine that the stitches are tested while they are being clinched. When a magazine is in place in the stitching machine, stitch driving members force the metal stitches through the sheets of the magazine, whereupon the ends of the stitches strike the clinchers and are bent against the magazine securely binding the sheets together. The stitch driving members are electrically grounded to the frame of the stitching machine and the clinchers are electrically insulated therefrom. Thus when a stitch is being clinched the clincher is grounded through the stitch to the stitch driving member. The stitches act as circuit completing elements and are schematically illustrated as switches 11 in Fig. 1.

Associated with each switch 11 is a dual-grid thyratron 12 with a plate 13, a cathode 14, a first control grid 15 and a second control grid 16. In series between switch 11 and cathode 14 is a charging resistance 17 and a parallel resistance-capacitance network comprising a resistance 18 and a capacitor 19. Grid resistance 20 is connected between the first control grid 15 and a point intermediate the charging resistance 17 and the parallel resistance-capacitance network.

The plates 13 of the thyratrons 12 are connected together by lead 21, the cathodes 14 are connected together by lead 22, and the second control grids 16 are connected together by lead 23.

A timing cycle switch 24 is connected between lead 23 and ground and when closed serves to ground the second control grids 16. The timing cycle switch 24, as will be hereinafter more fully explained, is controlled by the stitching machine. The second control grids 16 are also connected to the cathodes 14 through a connecting resistance 47.

A power supply, generally designated 25, receive its input from A. C. lines 26 and 27. The transformer 28 has a primary winding 29, a high voltage secondary winding 30, a low voltage secondary winding 31 and a secondary heater voltage winding 32. The secondary heater voltage winding 32 is connected to the heater elements of thyratrons 12 as indicated by the broken leads X—X. The heater elements of the thyratrons may be connected either in series or in parallel. The heater elements of thyratrons 12 may be eliminated altogether by the use of directly heated cathodes.

One end of the low voltage secondary winding 31 is connected to ground and the other end is connected through a rectifier 33 to one plate of a filter capacitor 34. The other plate of capacitor 34 is connected to ground. Hence, the filter capacitor 34 will have a D. C. voltage across it with the grounded plate negative and the ungrounded plate positive as indicated in Fig. 1.

The positive plate of capacitor 34 is also connected to one side of the high voltage secondary winding 30 and to a second filter capacitor 35. The other side of the high voltage secondary winding 30 is connected through a second rectifier 36 to the filter capacitor 35 in such a manner as to make negative the plate of the filter capacitor 35 connected to the positive plate of filter capacitor 34. Thus filter capacitor 35 will have a D. C. voltage across it of the polarity indicated in Fig. 1.

The cathodes 14 of thyratrons 12 are connected directly to the negative side of filter capacitor 35, while the plates 13 are connected to the positive side of filter capacitor 35 through a plate load resistance 37 and a coil 38 of relay 39. From this it will be seen that the plates 13 are positive with respect to cathodes 14 and that the cathodes 14 are positive with respect to ground.

The relay 39 has a relay arm 40 connected to terminal 41. In the deenergized state, relay arm 40 touches contact 42 connected to terminal 43 and in the energized state relay arm 40 touches contact 44 connected to terminal 45. Terminals 41 and 43 are, for example, connected in series with a relay controlling the power circuit of the stitching machine, and terminals 41 and 45 are, for example, connected in series with a signaling circuit. Thus, should relay 39 be energized, the power to the stitching machine will be cut off and a signal circuit will be completed.

In the following explanation of the operation of the circuit of Fig. 1, illustrative values will be given for the electrical components for the purpose of clarifying the manner in which the detector operates. It will be readily appreciated by one skilled in the art that these representative values may be widely varied.

Assuming A. C. lines 26 and 27 to be connected to 110 volt mains the D. C. voltages developed across filter capacitor 34 of 100 micro-farads will be assumed to be 25 volts and across filter capacitor 35 of 8 micro-farads will be assumed to be 100 volts with a polarity as shown in Fig. 1. Since the cathodes 14 are connected to the positive side of filter capacitor 34 and the negative side of filter capacitor 35 and the plates 13 are connected to the positive side of filter capacitor 35, the plates 13 are 100 volts positive with respect to the cathodes. Since the negative side of filter capacitor 34 is connected to ground, the cathodes 14 are 25 volts positive with respect to ground.

Thus, as long as the timing cycle switch 24 is closed, the second control grids 16 are held at a negative 25 volts with respect to the cathodes 14 due to the voltage drop across connecting resistance 47, and the thyratrons 12, which, by way of example, are type 502A tubes, will be held non-conductive. The timing cycle switch 24 is preferably a cam-controlled switch operated by the stitching machine and maintained in a closed position for all but a short period either during the time the stitch is being made or shortly thereafter.

When the stitches are being properly formed, the stitches ground the clinchers or, as illustrated in Fig. 1, close the switches 11. Upon closing switches 11 the capacitors 19 have a charge built up across them at a rate dependent upon the size of charging resistance 17, due to the 25 volts appearing between ground and cathodes 14. This voltage built up across capacitors 19 is the negative bias applied to the first control grids 15 through grid resistances 20. After the stitches have grounded the clincher for a sufficient time to build up the voltage across capacitors 19, this voltage, since it is applied to the first control grids 15, will maintain the thyratrons 12 non-conductive without any negative bias voltage being applied to the second control grids 16. The timing cycle switch 24 is then opened, thereby removing the 25 volts negative bias from second control grids 16 and placing them at the same potential as the cathodes 14 by means of connecting resistance 47. The bias voltage from capacitors 19 on the first control grids 15 then holds thyratrons 12 non-conductive. Timing cycles switch 24 is subseqently closed and the stitching machine then opens switches 11 by removing the stitch driving members from contact with the stitches. The voltage across capacitors 19 will be reduced at a sufficient rate to prepare the detectors for another cycle by the discharge of capacitors 19 through resistances 18.

Hence, as long as the stitches are properly made and provide an electrical path to charge capacitor 19, the thyratrons 12 remain non-conductive at all times. If any of the three stitches prove faulty, the clincher would not be grounded through the stitch and, as schematically illustrated, switch 11 would remain open. This prevents any voltage from being built up on the capacitor 19 associated with that particular stitch and the first control grid 15 remains at the potential of the cathode. When the timing cycle switch 24 opens, removing the negative bias voltage from the second control grids 16, the particular thyratron 12 associated with the faulty stitch will then have zero bias on each control grid and the tube will conduct plate current due to the 100 volts impressed between the plates 13 and cathode 14. This plate current flows through plate load resistance 37 and coil 38 of relay 39, causing the relay to shift arm 40 and open the circuit between terminals 41 and 43, thereby stopping the clinching machine, and to close the circuit between terminals 41 and 45, thereby energizing a signaling circuit to inform the operator of the reason for the shut-down of the stitcher.

The tubes used are thyratrons, and having once fired, their grids lose control and plate current will continue to flow even after timing cycle switch 24 has restored the negative bias to the second control grids 16. After the faulty magazine has been removed or any necessary adjustments or repairs have been made on the stitching machine to insure its proper operation, the thyratrons 12 are again placed under the control of the control grids 15 and 16 by breaking the common plate circuit of the tubes. This is effected by momentarily opening the reset switch 46. The circuit is then prepared to test the stitches in the manner previously described.

When using type 502A thyratrons, the plate load resistance 37 may be 7000 ohms when relay 39 operates at 10 milliamperes and the grid resistance 20, charging resistance 17, resistance 18, connecting resistance 47, and capacitor 19, may be respectively 100,000 ohms, 200 ohms, 2,000 ohms, 10,000 ohms, and 50 micro-farads.

Thus it will be seen that the circuit of Fig. 1 provides a very versatile stitch failure detector to be used on a stitching machine in which any practical number of stitches may be tested as they are being formed. The detector of Fig. 1 is illustrated with a circuit adapted to test three stitches. If it is desired to test more stitches, it is only necessary to add one stage to the circuit for each additional stitch, or if it is desired to test only two stitches, one stage is removed from the circuit. Each stage consists of thyratron 12 and its first control grid biasing circuit. A simple and effective way to secure this versatility in a standard article of commerce would be to build the detector with a large number of stages and then control the number of operable stages by removing or inserting thyratrons 12 in the tube sockets.

When the stitch completes an electrical circuit between the stitch driving member and the clincher, the capacitor 19 will be charged at a rate dependent upon the value of charging resistance 17. After the stitch driving member has been removed, breaking electrical contact with the stitch, the capacitor 19 will discharge at a rate dependent upon the value of resistance 18. Thus the period of time during which the first control grid 15 is effective in holding the thyratron 12 non-conductive may be widely varied by changing the value of either charging resistance 17 or resistance 18, or by changing the value of both. This period we shall refer to as a dwell period. By varying the dwell period, the time relationship between forming the stitch and opening and closing timing cycle switch 24 may be varied as desired.

In certain stitching operations it may be desirable to test the stitches at a point in the assembly process other than at the stitching machine. Fig. 2 shows a layout view of another form of the detector for inspecting the stitches in a magazine after the magazine has left the stitching machine. A magazine 48 with stitches 49 and 50 is carried by a conveyor belt 51 toward the stitch failure detector station 52 with the back, stitched edge of the magazine adjacent the belt.

Two roller contacts 53 and 54 are positioned adjacent the conveyor belt 51 and adapted to pass the magazines 48 therebetween. As a stitch passes between roller contacts 53 and 54, an electrical circuit is completed through the stitch from the grounded roller 53 to the ungrounded roller 54. A contact brush 55 continuously bears against contact roller 54 and provides a means of electrically connecting roller 54 through a lead 56 to an electronic circuit generally designated 57.

Positioned a short distance along the belt 51 in the direction of the belt movement is a first photo-tube 58 adapted to receive illumination from a light source 59. Still further along the belt 51 is a second photo-tube 60 with its light source 61. Leads 62 and 63 connect photo-tubes 58 and 60, respectively, to the electronic circuit 57.

First photo-tube 58 is so positioned that the leading edge of magazine 48 is interposed in the light beam between light source 59 and the first photo-tube 58 shortly after stitch 49 has completed electrical contact between grounded roller 53 and roller 54. Likewise the second photo-tube 60 is so positioned that the leading edge of magazine 48 is interposed in the light beam between light source 61 and the second photo-tube 60 shortly after stitch 50 has completed electrical contact between grounded roller 53 and roller 54.

The electronic circuit 57, the circuit for the photo-tubes 58 and 60, and the circuit of roller contacts 53 and 54 are shown more fully in the schematic diagram of Fig. 3.

The power supply shown in the upper left-hand corner of Fig. 3 is like that of Fig. 1 and numbers corresponding to those of Fig. 1 have been used to indicate corresponding parts. As previously explained in conjunction with Fig. 1 the filter capacitor 34 has 25 volts D. C. across its terminals with the polarity shown in Fig. 3 and the negative terminal is grounded as indicated. The filter capacitor 35 has 100 volts D. C. across its terminals and the negative terminal is connected to the positive side of capacitor 34.

A series of voltage dropping resistances 64, 65, and 66 are connected across the second filter capacitor 35 with the point intermediate voltage dropping resistances 64 and 65 connected to the plates 67 and 68 of photo-tubes 58 and 60, and with the point intermediate voltage dropping resistances 65 and 66 connected to the cathode 69 of a voltage limiting diode 70. A lead 71 connects the negative terminal of the second filter capacitor 35 to the cathode 72 of the first photo-tube 58 through a first resistance 73, to the cathode 74 of the second photo-tube 60 through a second resistance 75, to the cathode 76 of the pulsing tube 77, to the control grid 78 of pulsing tube 77 through a grid biasing resistance 79, to the cathode 80 of a dual grid thyratron 81, and to the first control grid 82 of the dual grid thyratron 81 through a grid biasing network generally designated 83, comprising two series resistances 84 and 85 connected between ground and lead 71 with the point intermediate series resistances 84 and 85 connected to the first control grid 82 through a grid resistance 86.

A lead 87 connects the positive terminal of the second filter capacitor 35 to the voltage dropping resistance 64, to the plate 88 of the pulsing tube 77 through a plate load resistance 89, to the screen grid 90 of pulsing tube 77 through a resistance 91 adapted to provide a reduced voltage for screen grid 90, and to the plate 92 of the dual grid thyratron 81 through a reset switch 93 and a coil 94 of a relay 95.

The relay 95 is similar to the relay 39 shown in Fig. 1 and has a relay arm 96 connected to terminal 97. In the deenergized state the relay arm 96 touches contact 98 connected to terminal 99 and when energized the arm 96 touches contact 100 connected to terminal 101. The terminals 97 and 99 may be connected in series with or to a relay controlling the power circuit of the stitching machine and the terminals 97 and 101 may be connected in series with a signalling circuit. Assuming the terminals to be so connected, the energization of relay 95 will open the power circuit to the stitching machine and close a signalling circuit to inform the operator as to the reason for the shut-down.

Two charge storing capacitors 102 and 103 are connected between the cathodes 72 and 74, respectively, of photo-tubes 58 and 60 and the control grid 78 of pulsing tube 77. The suppressor grid 104 of pulsing tube 77 is connected to the cathode 76 in the normal manner, and the plate 88 is connected to the plate 105 of voltage limiting diode 70 and the first control grid 82 of the dual grid thyratron 81 through a coupling capacitor 106.

A parallel resistance-capacitance network, comprising a discharging resistance 107 and a capacitor 108, is externally connected between the cathode 80 and a second control grid 109 of the dual grid thyratron 81. The second control grid 109 is also connected to the ungrounded roller 54 through a charging resistance 110.

In order to clarify the following explanation of the operation of the circuit of Fig. 3 illustrative values will be given for the electrical components.

During the time that the circuit is not actually testing a stitch, the first control grid 82 of dual grid thyratron 81 has applied to it a negative bias voltage. This negative bias voltage is the voltage drop across series resistance 84, since series resistances 85 and 84 are connected between ground and lead 71, which is 25 volts positive with respect to ground. If resistance 84 is 2200 ohms and resistance 85 is 5200 ohms, the negative bias voltage applied to the first control grid 82 through grid resistance 86 will be 7.6 volts, which bias voltage is sufficient to maintain non-conductive the dual grid thyratron 81, a type 502A tube. The grid resistance 86 may, by way of example, be a 1 megohm resistor.

Thus, the first control gird 82 of the dual grid thyratron 81 will have applied to its a negative D. C. grid bias except when the leading edge of magazine 48 interrupts the light beam to either of the photo-tubes 58 or 60, as will be hereinafter explained.

The plates of photo-tubes 58 and 60, which photo-tubes may be type 930 tubes, are connected intermediate the voltage dropping resistance 64 of 27,000 ohms and voltage dropping resistance 65 of 56,000 ohms, thereby placing the plates 67 and 68 at a positive potential with respect to cathodes 72 and 74. The voltage dropping resistance 66 may be an 8200 ohm resistor.

When the photo-tubes 58 and 60 are illuminated, current will flow through the tubes and also through the first resistance 73 and second resistance 75, both resistances being 5 megohm resistors. These D. C. photo-tube currents will develop a voltage drop across the first and second resistances 73 and 75, which voltage drop will in turn cause charge storing capacitors 102 and 103, of .01 micro-farad each, to be charged to a voltage equal to the voltage drop across the first and second resistances with a polarity as shown in Fig. 3. The 1 megohm grid biasing resistance 79 provides the path for charging capacitors 102 and 103 and the value of the resistance determines the time required to fully charge the capacitors after the photo-tubes are illuminated. While charge storage capacitors 102 and 103 are being charged, the voltage developed across grid biasing resistance 79 is of such a polarity as to make the grid 78 of pulsing tube 77 positive with respect to the cathode 76. After the charge storing capacitors 102 and 103 have been fully charged, there will no longer be a voltage developed across the grid biasing resistance 79, therefore the grid 78 and the cathode 76 will be at the same potential. Thus, when photo-tubes 58 and 60 are receiving illumination, the bias voltage on pulsing tube 77 will be either positive or zero. Using a 6SJ7 pentode for pulsing tube 77, the positive or zero bias will be sufficient to maintain plate current flow through the tube.

When the light incident upon the cathodes 72 of the first photo-tube 58 is interrupted by the leading edge of magazine 48, the current through the tube is stopped and, since first resistance 73 is in series with photo-tube 58, no voltage is developed across first resistance 73. The charge storing capacitor 102 will then discharge through the grid biasing resistance 79 with a polarity that makes the grid 78 negative with respect to the cathode 76. This momentarily provides a negative bias to pulsing tube 77 reducing the plate current therethrough.

Since the cathode 76 of pulsing tube 77 is at the same potential as cathode 80 of the dual grid thyratron, and since the plate 88 of pulsing tube 77 is connected to the first control grid 82 of the dual grid thyratron 81 through the coupling capacitor 106, the increased voltage drop from the plate to the cathode of pulsing tube 77, due to the decrease in plate current, appears as a positive biasing pulse on the first control grid 82.

When pulsing tube 77 is a type 6SJ7 tube, the plate load resistance 89 and resistance 91 may be 200,000 and 100,000 ohms, respectively, and coupling capacitor 106 may be .01 micro-farads. The voltage limiting diode 70, which may, by way of example, be a type 6H6 tube, serves to prevent excessive positive voltage pulses from being applied to the grid 82. Should the positive voltage pulse impressed on the first control grid 82 be above a predetermined value, the plate 105 of voltage limiting diode 70 will become sufficiently positive with respect to cathode 69 to cause the tube to conduct current, thereby providing an upper limit on the positive pulse voltage.

The second grid 109 of the dual grid thyratron 81 is associated with a stitch testing portion of the circuit similar to that of Fig. 1 except that contact rollers 53 and 54 are the members that contact the stitch instead of the stitch driving member and the clincher. Since, as previously explained, the cathode 80 of dual grid thyratron 81 is 25 volts positive with respect to ground, the capacitor 108 will be charged at a rate dependent upon the size of charging resistance 110, whenever a stitch completes electrical communication between the grounded roller 53 and the roller 54. This charge built up on capacitor 108 is of the polarity shown in Fig. 3 and acts as a negative grid bias on the second control grid 109. The charging resistance 110 and capacitor 108 may be, by way of example, 220 ohms and 50 micro-farads.

The discharging resistance 107 of 1,000 ohms is connected in parallel with capacitor 108 to provide a path for the discharge of the capacitor after the stitch has been removed from between rollers 53 and 54. A movable contact 111 is provided to vary the effective value of the discharging resistance 107 and thereby control the time required for capacitor 108 to completely discharge. This provides the operator with a simple method of controlling the duration of the dwell period in which the testing of a single stitch can place a negative bias on the second control grid 109.

From the foregoing it will be seen that the first control grid 82 of the dual grid thyratron 81 has a negative bias voltage developed by the grid biasing network 83 and this bias voltage is sufficient to maintain thyratron 81 non-conductive, that the second control grid 109 has a negative bias voltage applied to it when the stitch completes the circuit between rollers 53 and 54 and this bias voltage is sufficient to maintain thyratron 81 non-conductive, and that the negative bias voltage applied to first control grid 82 is momentarily offset by the positive voltage pulse developed by the interruption of light to either photo-tube 58 or 60 after the stitch is positioned between rollers 53 and 54. Thus as long as the stitches being tested are properly made and positioned, the dual grid thyratron 81 will remain non-conductive.

If a stitch should be missing, improperly made, or improperly positioned, a negative bias will not exist on the second control grid 109, when the negative grid bias from grid biasing network 83 is nullified by the positive pulse voltage, and the thyratron 81 will conduct current. This plate current flows through coil 94 of relay 95 and actuates the relay, which may, for example, be a 5000 ohm relay. The relay 95 will then perform the previously described functions of stopping the machine and warning the operator or may perform any other desired function. The plate current, having been initiated through thyratron 81, will continue to flow until reset switch 93 is at least momentarily opened. After being reset the circuit is again in condition to resume its testing function.

By permitting the negative grid bias on the second control grid 109 to dwell for a short interval, a slight displacement of the stitch will be ineffective in registering as a faulty stitch. The maximum duration of this dwell period is, however, limited, since the grid bias on the second control grid 109 must have become ineffective before the next stitch is to be tested.

Figure 4 is a layout view of a third form of our detector in which the absence or improper fabrication or location of a stitch will actuate the detector. Since Fig. 4 is in most respects similar to Fig. 2, corresponding numerals have been used to designate corresponding parts. In place of the roller contacts shown in Fig. 2, two magnetically coupled coils 112 and 113 are located adjacent the conveyor belt with their axes in the plane of movement of the stitches 49 and 50. These coils are connected by a cable 114 to an electronic circuit 115, which differs from electronic circuit 57 of Fig. 2 in several respects that will hereinafter be explained.

The circuits of Figs. 1, 2, and 3 utilize the electrical conductivity of the stitch to perform the test on the stitch, while the detector of Figs. 4 and 5 depends for its operation upon the ability of the stitch to alter the coupling between magnetically coupled coils when passed therebetween.

Referring now to Fig. 5, which is a schematic diagram of the detector illustrated in Fig. 4, it will be noted that the voltage dropping resistances 64, 65, and 66, photo-tubes 58 and 60, first and second resistances 73 and 75, grid biasing resistance 79, charge storing capacitors 102 and 103, pulsing tube 77, plate load resistance 89, resistance 91, and coupling capacitor 106 are connected in precisely the same manner as shown in Fig. 3 and corresponding numbers have been used to indicate the corresponding parts.

The power supply illustrated in Fig. 5 is a full wave rectifier and provides the necessary D. C. voltage across voltage dropping resistances 64, 65, and 66. The primary winding 116 of transformer 117 is connected across A. C. lines 118 and 119 and the center-topped secondary winding 120 is connected between the plates 121 and 122 of the dual diode 123. The cathode 124 is directly heated by means of secondary winding 124a. Connected between the center-top of winding 120 and the cathode 124 is a filter capacitor 125, which will have a D. C. voltage across its terminals of the polarity illustrated. The filter capacitor 125 is also connected in parallel with the voltage dropping resistances 64, 65, and 66. A secondary heater winding 126 is also wound on transformer 117 to provide the power necessary to heat the indirectly heated cathodes of the electronic tubes.

The coupling capacitor 106 is connected to the plate 127 and the grid 128 of a voltage limiting triode, which is contained within a dual-triode tube 129. The cathode 130 of the voltage limiting triodes is connected to a point intermediate voltage dropping resistances 65 and 66. Since the plate 127 and grid 128 are connected together, the voltage limiting triode acts as a diode, is connected in the circuit in the same manner as the voltage limiting diode 70 of Fig. 3, and serves exactly the same function.

The other triode within the dual-triode tube 129 has a plate 131, grid 132 and cathode 133 connected in a regenerative radio frequency oscillator circuit. The coil 112 in the grid portion of the oscillator circuit is shunted by a tuning capacitor 134, which serves as a means of determining the frequency of oscillation of the circuit. A grid leak resistance 135 shunted by capacitor 136 is connected between the coil 112 and the grid 132. The coil 113 is connected between the plate 131 and the positive D. C. potential lead and is positioned in such a way as to be inductively coupled to the coil 112. A by-pass capacitor 137 is connected between the positive D. C. potential and the cathode 133.

Since the explanation of the operation of a regenerative oscillator is readily available in practically any textbook on electronic circuits, it will suffice to say that the regenerative oscillator will continually oscillate as long as sufficient magnetic coupling is maintained between coils 112 and 113. If the magnetic coupling between coils 112 and 113 is sufficiently reduced by inserting the stitch 49 between coils 112 and 113, the energy fed back into the grid circuit from the plate circuit will be likewise reduced and the oscillator will cease oscillation which in turn causes an increase in the D. C. plate current.

A grid biasing resistance 138 shunted by a charge storing capacitor 139 is connected between the cathode 133 and the negative D. C. potential lead. It will be noted that with this connection the D. C. plate current flowing through the regenerative oscillator triode will also flow through the grid biasing resistance 138. Thus, the grid biasing resistance 138 and the charge storing capacitor 139 will have a certain D. C. voltage across them while the oscillator is oscillating and a greater D. C. voltage when the oscillator is not oscillating. Both of these voltages will have the polarity shown on charge storing capacitor 139 in Fig. 5.

The control tube 140, which is again shown as a thyratron, has cathode, plate, control grid and second grid elements numbered 141, 142, 143, and 144, respectively. While the control tube 140 is shown as the same type of thyratron as the control tubes in Figs. 1 and 3, it should be noted the second grid 144 is connected to the cathode and acts merely as a suppressor grid. If desired, grid 144 could be eliminated.

A lead 145 connects the cathode 141 of control tube 140 to the cathode 133 of the oscillator triode and another lead 146 connects the grid 143 to the coupling capacitor 106. The grid 143 is also connected to the negative D. C. voltage lead 147 through a grid resistance 148. A relay and reset switch, identical to that of Fig. 3, and therefore correspondingly numbered, are connected between the plate 142 of control tube 140 and the positive D. C. voltage lead 149.

In the following description of the operation of the detector of Figs. 4 and 5, typical values will be given for the circuit components in an effort to simplify the understanding of the operating principles. As previously stressed, these values should be considered as purely illustrative and are not to be considered as unduly limiting the applicability of the general principles involved.

It will be assumed that the power supply is adapted to provide 225 volts D. C. with the polarity indicated and that voltage dropping resistances 64, 65, and 66 drop the voltage 135, 78, and 12 volts, respectively. As previously stated, the portion of the detector circuit between the photo-tube 58 on the left and coupling capacitor 106 on the right is similar to the corresponding portion of the circuit shown in Fig. 3 and the electrical elements so included may, if desired, be identical to those set forth for Fig. 3. The dual-triode 129 and the control tube 140 may be types 6SN7 and 502A tubes. In the oscillator circuit the coils 112 and 113 are 10 micro-henrys, capacitors 136 and 137 are 250 micromicrofarads, capacitor 134 is 10 micromicro-farads, and grid leak resistance 135 is 0.5 megohm. Grid biasing resistance 138, charge storing capacitor 139, and grid resistance 148 may be 5000 ohms, 5 micro-farads and 1 megohm, respectively.

Referring now to both Figs. 4 and 5, when the magazine 48 reaches the position such that the stitch 49 is interposed between the coils 112 and 113, the magnetic coupling between the coils is reduced causing the regenerative oscillator to cease oscillating and thereby increase the voltage across grid biasing resistance 138 due to the increased D. C. plate current flow through the oscillator triode. This increase in voltage appears as an increase in negative grid bias voltage on the control grid 143 of control tube 140 by making the cathode 141 more positive relative to the control grid 143. It should be noted that the voltage across grid biasing resistance 138, when the regenerative oscillator is oscillating, must be of sufficient value to maintain the control tube 140 non-conductive. Thus the increase in the voltage across resistance 138 places a greater negative bias voltage on control grid 143.

Shortly after this increased negative bias has been applied to control grid 143, the leading edge of magazine 48 interrupts the light beam to photo-tube 58 and in the manner previously explained a positive voltage pulse is applied to the control grid 143 of control tube 140. The magnitude of the positive pulse is limited by the voltage limiting triode and is not sufficient to overcome the effect of the negative grid bias voltage from grid biasing resistance 138 and charge storing capacitor 139. Hence, control tube 140 will remain non-conductive.

The subsequent testing of stitch 50 is carried out in precisely the same manner except that in this case the photo-tube 60 will be the active tube.

If a stitch is missing from the magazine or improperly formed or displaced from its proper position, the increased negative bias on control grid 143 will not exist when the leading edge of the magazine interrupts one of the beams of light and causes the positive voltage pulse to be impressed on the control grid 143 raising the grid bias voltage above cutoff. Plate current will then flow through control tube 140 actuating the relay to stop the machine and operate the indicator. The reset switch 93 may then be opened and closed to reset the circuit for subsequent testing after the difficulty has been overcome.

Since the charge storing capacitor 139 is connected in parallel with grid biasing resistance 138 and since the voltage across a capacitor cannot change instantaneously, the capacitor 139 serves to delay the changes in voltage across resistance 138, thereby providing what we have termed a dwell period. By varying the value of either charge storing capacitor 139 or grid biasing resistance 138 or by varying the value of both, the duration of the dwell period can be controlled. The duration of the dwell period determines the time that the control grid 143 is maintained at a sufficiently negative voltage to make the positive pulse of voltage from the pulsing tube 77 ineffective and hence determines the maximum displacement of the stitch from its normal position that will not cause a stitch failure to be indicated. Thus, by varying the dwell period the detector may be adapted to indicate any desired accuracy in the positioning of the stitches.

The detectors illustrated in Figs. 2 through 5 are readily adaptable to test any given number of stitches within a product. For instance, if three stitches are to be tested, it is necessary only to connect a third photo-tube, a third charge storing capacitance, and a third resistance similar to photo-tubes 58 and 60, charge storing capacitances 102 and 103, and first and second resistances 73 and 75, respectively. Likewise, these same elements may be disconnected if the number of stitches to be tested is reduced. It may be desirable in testing various numbers of stitches to build the detector so that the maximum number of stitches can be tested; then, if the number of stitches to be tested is less than the maximum, one need only to remove the photo-tubes associated with the missing stitches and the detector will properly perform on this lesser number of stitches.

While we have illustrated the power supply for the various detectors as being either a full-wave or half-wave rectifier, it should be apparent that any conventional power supply such as a battery, generator, etc., may be used. Also, the control tubes have been illustrated as dual-grid thyratrons, but it should be appreciated that these control tubes may be selected from other classes of electronic tubes.

From the foregoing it will be apparent that we have provided a simple, inexpensive, and effective means for automatically detecting stitch failures and that this means can be adapted to a wide variety of uses and conditions. While we have described particular embodiments of our invention, we do not intend to be restricted thereto but intend to cover all modifications, variations, and equivalents coming within the scope of the appended claims.

We claim:

1. A stitch failure detector for testing stitches formed in a product, comprising a control tube, plate current control means within said tube, actuating means adapted to be operated by the plate current, stitch sensing means to place a first control voltage on said plate current control means in response to the testing of a properly made stitch, and product position sensing means adapted to regulate the placement of a second control voltage on said plate current control means in response to the positioning of said product, whereby the testing of a faulty stitch will cause the actuating means to operate.

2. In a stitch failure detector for testing stitches formed in a product, the combination with a power supply of a control tube, plate current control means within said tube, actuating means adapted to be operated by the plate current, stitch sensing means to place a first control voltage on said plate current control means in response to the testing of a properly made stitch, and product position sensing means adapted to regulate the placement of a second control voltage on said plate current control means in response to the positioning of said product, wherein the testing of a faulty stitch will cause the actuating means to operate.

3. A stitch failure detector for testing stitches formed in a product, comprising a control tube, plate current control means within said tube, a stitch sensing circuit adapted to place a first control voltage on said plate current control means in response to the testing of a properly made stitch, a product position circuit adapted to regulate the placement of a second control voltage on said plate current control means in response to the positioning of said product, and an actuator connected to said control tube and adapted to be operated by the testing of a faulty stitch.

4. A stitch failure detector for testing stitches formed in a product, comprising a control tube, plate current control means within said tube, an actuator adapted to be operated by the plate current, a stitch sensing circuit to place a first control voltage on said plate current control means in response to the testing of a properly made stitch, said stitch sensing means connected to the parallel combination of a resistor and capacitor and arranged to have the first control voltage developed thereacross increase and decrease at a predetermined rate to provide a dwell period for said first control voltage, and a product position sensing circuit adapted to regulate the placement of a second control voltage on said plate current control means in response to the positioning of said product, whereby the testing of a faulty stitch will cause the actuating means to operate.

5. A stitch failure detector for testing stitches formed in a product, comprising a control tube, plate current control means within said tube, actuating means adapted to be operated by the plate current, stitch sensing means to place a first control voltage on said plate current control means in response to the testing of a properly made stitch, and product position sensing means adapted to regulate the placement of a second control voltage on said plate current control means in response to the positioning of said product, said product position sensing means containing a light source and a photo-tube, wherein the position of said product determines the illumination incident upon said photo-tube.

6. A stitch failure detector for testing stitches formed in a product, comprising a control tube, plate current control means within said tube, actuating means adapted to be operated by the plate current, stitch sensing means to place a first control voltage on said plate current control means in response to the testing of a properly made stitch, said stitch sensing means connected to the parallel combination of a resistor and capacitor and arranged to have the first control voltage developed thereacross increase and decrease at a predetermined rate to provide a dwell period for said first control voltage, and said product position sensing means containing a light source and a photo-tube, wherein the position of said product determines the illumination incident upon said photo-tube.

7. A stitch failure detector for testing stitches while they are being formed in a product by a stitching machine, said detector comprising a control tube, plate current control means within said tube, actuating means adapted to be operated by the plate current, stitch sensing means to place a first control voltage on said plate current control means in response to the testing of a properly made stitch, and product position sensing means adapted to regulate the placement of a second control voltage on said plate current control means in response to the positioning of said product, said product position sensing means being controlled by the operating cycle of said stitching machine.

8. A stitch failure detector for testing stitches while they are being formed in a product by a stitching machine, said detector comprising a control tube, plate current control means within said tube, actuating means adapted to be operated by the plate current, stitch sensing means to place a first control voltage on said plate current control means in response to the testing of a properly made stitch, and product position sensing means adapted to regulate the placement of a second control voltage on said plate current control means in response to the positioning of said product, said product position sensing means being controlled by the operating cycle of said stitching machine, said stitch sensing means connected to the parallel combination of a resistor and capacitor and arranged to have the first control voltage developed thereacross increase and decrease at a predetermined rate to provide a dwell period for said first control voltage.

9. A stitch failure detector for testing stitches formed in a product, comprising a control tube, plate current control means within said tube, actuating means adapted to be operated by the plate current, stitch sensing means to place a first control voltage on said plate current control means in response to the testing of a properly made stitch, impedance elements connected to said stitch sensing means to provide a predetermined time rate of change for said first control voltage, and product position sensing means adapted to regulate the placement of a second control voltage on said plate current control means in response to the positioning of said product, wherein the testing of a faulty stitch will cause the actuating means to operate.

10. In a stitch failure detector for testing stitches formed in a product, the combination with a conveyor for moving the stitched products through the stitch failure detector station, of a control tube, plate current control means within said tube, actuating means adapted to be operated by the plate current, stitch sensing means disposed near the path of movement of said stitches and adapted to place a first control voltage on said plate current control means in response to the passage of a properly made stitch, and product position sensing means disposed near the path of movement of said product and adapted to place a second control voltage on said plate current control means in response to the product reaching a position corresponding to the product position necessary to produce said first control voltage, wherein the passage of the product with a faulty stitch therein through the detector station will permit the second control voltage to alter the plate current flow through said control tube and operate said actuating means.

11. In a stitch failure detector for testing stitches formed in a product, the combination with a power supply of a control tube having a plate and a cathode, a plate circuit for said tube connected to said power supply, plate, and cathode, plate current control means within said tube, a current responsive actuator in said plate circuit, said actuator being operated by changes in plate current, a stitch testing circuit connected to said power supply and said plate current control means, a product position determining circuit connected to said power supply and said plate current control means, whereby the voltages applied to said plate current control means from said stitch testing circuit and said product position determining circuit alter the plate current flow to operate said current responsive actuator, when said product is properly positioned for testing a stitch and the stitch being tested is faulty, and fail to alter the plate current flow to maintain the current responsive actuator inoperative, when the detector is not testing a stitch or when the product is properly positioned for testing a stitch and the stitch being tested is properly formed.

12. In a stitch failure detector for testing stitches in a product, the combination of a control circuit, a stitch testing circuit, a product position determining circuit and a power supply, said control circuit containing a thyratron having a plate, a cathode, and plate current control means, a current responsive actuator, a plate circuit connecting said cathode, plate, current responsive actuator, and power supply, said stitch testing circuit connected to said plate current control means and power supply and adapted to provide a negative bias on said plate current control means in response to testing a properly formed stitch, and said product position determining circuit connected to said plate current control means and power supply and adapted to provide a positive grid bias to said plate current control means, when the product reaches a position corresponding with the product position at which the stitch is tested, whereby said plate current control means precludes plate current flow through said plate circuit when the stitch being tested is properly formed.

13. In a stitch failure detector for testing stitches formed in a product, the combination with a power supply of a dual-grid, thyratron control tube having plate, cathode, first control grid, and second control grid elements, a plate circuit connecting said plate, cathode, and power supply, a current responsive actuator connected in said plate circuit, a parallel resistor and capacitor connected between said first control grid and said cathode, a first stitch contacting member connected to said first control grid, a second stitch contacting member connected to said power supply at a point having a negative potential with respect to the potential of said cathode, a negative grid biasing means connected between said second control grid and said cathode, and a photo-electric pulsing circuit connected between said second control grid and said cathode, said photo-electric pulsing circuit being adapted to provide a positive pulse of voltage to said second control grid, when said product is properly positioned to test a stitch, said positive pulse of voltage being sufficient to overcome the negative grid bias on said second control grid and initiate plate current flow through said plate circuit, whereby a negative grid bias voltage will be applied to said first control grid to preclude the initiation of plate current flow when the stitch between said first and second stitch contactors is not faulty.

14. In a stitch failure detector for testing stitches formed in a product, the combination with a power supply of a dual-grid, thyratron control tube having plate, cathode, first control grid, and second control grid elements, a plate circuit connecting said plate, cathode, and power supply, a current responsive actuator connected in said plate circuit, a parallel resistor and capacitor connected between said first control grid and said cathode, a first stitch contacting member connected to said first control grid, a second stitch contacting member connected to said power supply at a point having a negative potential with respect to the potential of said cathode, a negative grid biasing means connected between said second control grid and said cathode, an electronic tube having a second plate, second cathode, and control grid element, a second plate circuit for said electronic tube connecting said second plate, second cathode and power supply, a grid resistor connected between said control grid and said second cathode, a photo-tube and voltage dropping resistor connected in series across said power supply, a capacitor connected between said control grid and a point intermediate said photo-tube and voltage dropping resistor, and an electrical coupling element between said second plate and said second control grid, whereby the interruption of light incident upon said photo-tube by the product produces a positive voltage pulse on said second control grid sufficient to overcome the negative grid bias thereon and substantially simultaneously therewith a negative bias voltage is applied through the stitch being tested to the first control grid, when said stitch is properly formed, preventing plate current from being initiated through said thyratron control tube.

15. In a stitch failure detector for testing a stitch as it is being formed in a product between a stitch driving member and a clincher of a stitching machine, a power supply having a high positive voltage tap, a low positive voltage tap, and a negative voltage tap, a dual grid thyratron having plate, cathode, first control grid, and second control grid elements, a series plate circuit connecting said low positive voltage tap, cathode, plate, and high positive voltage tap, a current responsive actuator in said series plate circuit, a switching means connected between said second control grid and said negative voltage tap, a parallel resistor and capacitor combination connected between said cathode and said first control grid, an electrical connection between the stitch driving member and said first control grid, an electrical connection between said negative voltage tap and the clincher, wherein the stitch being formed completes electrical contact between said stitch driving member and said clincher and said switching means is opened by said stitching machine when a stitch is being formed.

16. In a stitch failure detector for testing stitches formed in a product, the combination with a power supply of a thyratron control tube having plate, cathode and grid elements, a plate circuit connecting said plate, cathode and power supply, a current responsive actuator connected in said plate circuit, a parallel resistor and capacitor connected between said grid and cathode, a positive feed back oscillator circuit with oscillator plate and grid circuits, said oscillator plate circuit being in series with said parallel resistor and capacitor, mutually coupled coils in said oscillator plate and grid circuits, and a photo-electric pulsing circuit connected between said grid and cathode, said photo-electric pulsing circuit being adapted to provide a positive pulse of voltage to said grid in response to a given positioning of said product, wherein the positioning of a stitch between said mutually coupled coils will terminate the oscillation of said oscillator and develop a larger voltage across said parallel resistor and capacitor to drive said grid more negative.

17. In a stitch failure detector for testing stitches formed in a product, the combination with a power supply of a thyratron control tube having plate, cathode and grid elements, a plate circuit connecting said plate, cathode and power supply, a current responsive actuator connected in said plate circuit, a parallel resistor and capacitor connected between said grid and cathode, a positive feed back oscillator circuit with oscillator plate and grid circuits, said oscillator plate circuit being in series with said parallel resistor and capacitor, mutually coupled coils in said oscillator plate and grid circuit, an electronic tube having a second plate, second cathode and control grid elements, a second plate circuit for said electronic tube connecting said second plate, second cathode and power supply, a grid resistor connected between said control grid and second cathode, a photo-tube and voltage dropping resistor connected in series across said power supply, a capacitor connected between said control grid and a point intermediate said photo-tube and voltage dropping resistor, and an electrical coupling element between said second plate and said grid, whereby the interruption of light incident upon said photo-tube by the product produces a positive voltage pulse on said grid and the positioning of a stitch between said mutually coupled coils will terminate the oscillation of said oscillator and develop a larger voltage across said parallel resistor and capacitor.

18. A stitch failure detector for testing stitches formed in a product, comprising a thyratron control tube, plate current control means within said tube, stitch sensing means to place a first control voltage on said plate current control means in response to the testing of a properly made stitch, product position sensing means adapted to regulate the placement of a second control voltage on said plate current control means in response to the positioning of said product, actuating means connected to said control tube and adapted to be operated by the testing of a faulty stitch, and a reset switch to break the plate current circuit and operate said actuator.

19. A detector for testing the presence and condition of an electrically conductive element formed in a non-conductive article, comprising a control tube, a plate circuit, plate current control means in said tube, an actuator adapted to be operated by the plate current, a stitch sensing circuit to place a first control voltage on said plate current control means in response to the testing of a properly made stitch, and a product position sensing circuit adapted to regulate the placement of a second control voltage on said plate current control means in response to the positioning of said product, whereby the testing of a faulty stitch will alter the plate current flow causing the actuator to operate.

20. A stitch failure detector for testing stitches formed in a product, comprising a control tube having a plate circuit, plate current control means within said tube, leads in said plate circuit adapted for connection to an actuator, stitch sensing means to place the first control voltage on said plate current control means in response to the testing of a properly made stitch, and product position sensing means adapted to regulate the placement of a second control voltage on said plate current control means in response to the positioning of said product, whereby the testing of a faulty stitch will prevent the application of said first control voltage and cause the plate current flow to be altered.

21. In a stitch failure detector for testing stitches formed in a product, a control tube, means to control current flow through said control tube, a first circuit adapted to place a first voltage on said control means when a stitch is electrically tested, and a second circuit adapted to control the application of a second voltage on said control means when said product is in a given position, said current flow through said control tube having an initial value when said detector is not in testing operation, said initial value being maintained when said first and second voltages are applied to said control means in response to the testing of a properly made stitch and in response to the product position, said current flow being altered to another value when a faulty stitch prevents the application of said first voltage to said control means and when said second voltage is applied thereto, whereby changes in the current flow are indicative of a faulty stitch.

22. In a stitch failure detector for testing a stitch as it is being formed in a product between a stitch driving member and a clincher of a stitching machine, a power supply having a high positive voltage tap, a low positive voltage tap, and a negative voltage tap, a dual grid thyratron having plate, cathode, first control grid, and second control grid elements, a series plate circuit connecting said low positive voltage tap, cathode, plate and high positive voltage tap, leads in said plate circuit adapted to be connected with an actuator, a switching means connected between said second control grid and said negative voltage tap, a parallel resistor and capacitor combination connected between said cathode and said first control grid, an electrical connection between the stitch driving member and said first control grid, an electrical connection between said negative voltage tap and the clincher, wherein the stitch being formed completes electrical contact between said stitch driving member and said clincher and said switching means is opened by said stitching machine when a stitch is being formed.

23. In a stitch failure detector for testing stitches formed in a product, the combination with a power supply of a dual-grid, thyratron control tube having plate, cathode, first control grid, and second control grid elements, a plate circuit connecting said plate, cathode, and power supply, leads in said plate circuit adapted to be connected to an actuator, a parallel resistor and capacitor connected between said first control grid and said cathode, a first stitch contacting member connected to said first control grid, a second stitch contacting member connected to said power supply at a point having a negative potential with respect to the potential of said cathode, a negative grid biasing means connected between said second control grid and said cathode, an electronic tube having a second plate, second cathode, and control grid element, a second plate circuit for said electronic tube connecting said second plate, second cathode and power supply, a grid resistor connected between said control grid and said second cathode, a photo-tube and voltage dropping resistor connected in series across said power supply, a capacitor connected between said control grid and a point intermediate said photo-tube and voltage dropping resistor, and an electrical coupling element between said second plate and said second control grid, whereby the interruption of light incident upon said photo-tube by the product produces a positive voltage pulse on said second control grid sufficient to overcome the negative grid bias thereon and substantially simultaneously therewith a negative bias voltage is applied through the stitch being tested to the first control grid, when said stitch is properly formed, preventing plate current from being initiated through said thyratron control tube.

24. In a stitch failure detector for testing stitches formed in a product, the combination with a power supply of a thyratron control tube having plate, cathode and grid elements, a plate circuit connecting said plate, cathode and power supply, said plate circuit having leads adapted to be connected to an actuator, a parallel resistor and capacitor connected between said grid and cathode, a positive feed back oscillator circuit with oscillator plate and grid circuits, said oscillator plate circuit being in series with said parallel resistor and capacitor, mutually coupled coils in said oscillator plate and grid circuits, an electronic tube having a second plate, second cathode and control grid elements, a second plate circuit for said electronic tube connecting said second plate, second cathode and power supply, a grid resistor connected between said control grid and said second cathode, a photo-tube and voltage dropping resistor connected in series across said power supply, a capacitor connected between said control grid and a point intermediate said photo-tube and voltage dropping resistor, and an electrical coupling element between said second plate and said grid, whereby the interruption of light incident upon said photo-tube by the product produces a positive voltage pulse on said grid and the positioning of a stitch between said mutually coupled coils will terminate the oscillation of said oscillator and develop a larger voltage across said parallel resistor and capacitor.

HARRY CONRAD.
LEE BOWERS.

References Cited in the file of this patent
UNITED STATES PATENTS

| Number | Name | Date |
|---|---|---|
| 2,045,769 | Giffcken | June 30, 1936 |
| 2,150,440 | Hargreaves | Mar. 14, 1939 |
| 2,274,384 | Scanlan | Feb. 24, 1942 |
| 2,313,917 | Brownlee | Mar. 16, 1943 |
| 2,386,942 | Edelman | Oct. 16, 1945 |
| 2,415,167 | Gieseke | Feb. 4, 1947 |
| 2,481,485 | Stanton | Sept. 13, 1949 |
| 2,540,063 | Victoreen | Jan. 30, 1951 |
| 2,570,381 | Roughsledge et al. | Oct. 9, 1951 |